US012728461B2

(12) United States Patent
Peris Bono et al.

(10) Patent No.: US 12,728,461 B2
(45) Date of Patent: Sep. 8, 2026

(54) TOOL HOLDER FOR METAL DRILLING, THREADING AND MILLING MACHINES

(71) Applicants: Juan José Peris Bono, Alzira (ES); Ana María Peris Bono, Alzira (ES); Antoni Peris Bono, Alzira (ES); Sergi Peris Clari, Alzira (ES); Guillem Peris Clari, Alzira (ES)

(72) Inventors: Juan José Peris Bono, Alzira (ES); Ana María Peris Bono, Alzira (ES); Antoni Peris Bono, Alzira (ES)

(73) Assignees: Juan José Peris Bono, Alzira (ES); Ana María Peris Bono, Alzira (ES); Antoni Peris Bono, Alzira (ES); Sergi Peris Clari, Alzira (ES); Guillem Peris Clari, Alzira (ES)

( * ) Notice: Subject to any disclaimer, the term of this patent is extended or adjusted under 35 U.S.C. 154(b) by 204 days.

(21) Appl. No.: 18/644,771

(22) Filed: Apr. 24, 2024

(65) Prior Publication Data

US 2024/0359239 A1 Oct. 31, 2024

(30) Foreign Application Priority Data

Apr. 25, 2023 (ES) .................................. 202330327

(51) Int. Cl.
*B23B 31/08* (2006.01)

(52) U.S. Cl.
CPC ........ *B23B 31/08* (2013.01); *B23B 2260/136* (2013.01); *Y10T 279/25* (2015.01)

(58) Field of Classification Search
CPC ..... B23B 31/08; B23B 31/083; B23B 31/008; B23B 31/021; B23B 33/005;
(Continued)

(56) References Cited

U.S. PATENT DOCUMENTS 1,241,175 A * 9/1917 Watts ...................... B23B 31/08 279/16
2,574,016 A 11/1951 Burg
2,820,378 A 1/1958 Randles et al.

FOREIGN PATENT DOCUMENTS

EP 0108493 A1 * 5/1984 ............. B27G 15/00
ES P 202330327 4/2023
GB 667001 A 2/1952

OTHER PUBLICATIONS

Report on the State of the Art of the National Patent application 202330327, made by OEPM (Spanish Patent Office), Madrid, Sep. 19, 2023, 14 pages including an English Translation.

* cited by examiner

*Primary Examiner* — Alan Snyder
(74) *Attorney, Agent, or Firm* — Brooks Kushman P.C.

(57) ABSTRACT

A tool holder for metal drilling, threading and milling machines comprising three parts, of which the first part has a base forming a plate having an axial appendage for joining the parts together and two diametrically opposed mounting holes for receiving the ends of two shafts fastened to the plate-shaped second part, and two other shafts on the opposite face, the ends of which are seated in diametrically opposed mounting holes in the third part, which has a tubular axial passage and two oval appendages in the opening thereof that are intended to be coupled to the concave sides of the axial appendage of the first part, with the appendages being retained by a circular spring. The three parts are joined together by a ring that is fastened to the axial appendage of the first part.

1 Claim, 3 Drawing Sheets

(58) Field of Classification Search
CPC ............ B23B 2231/22; B23B 2231/54; B23B 2260/136; B23B 2270/12
USPC ............................................ 279/8, 132, 133
See application file for complete search history.

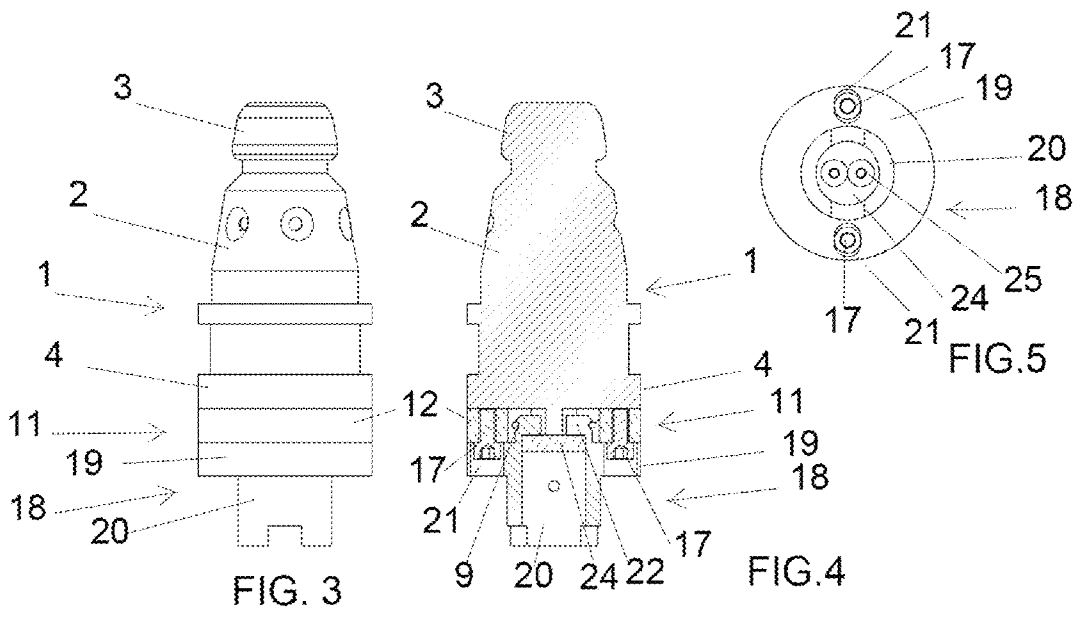
FIG. 3
FIG.4
FIG.5
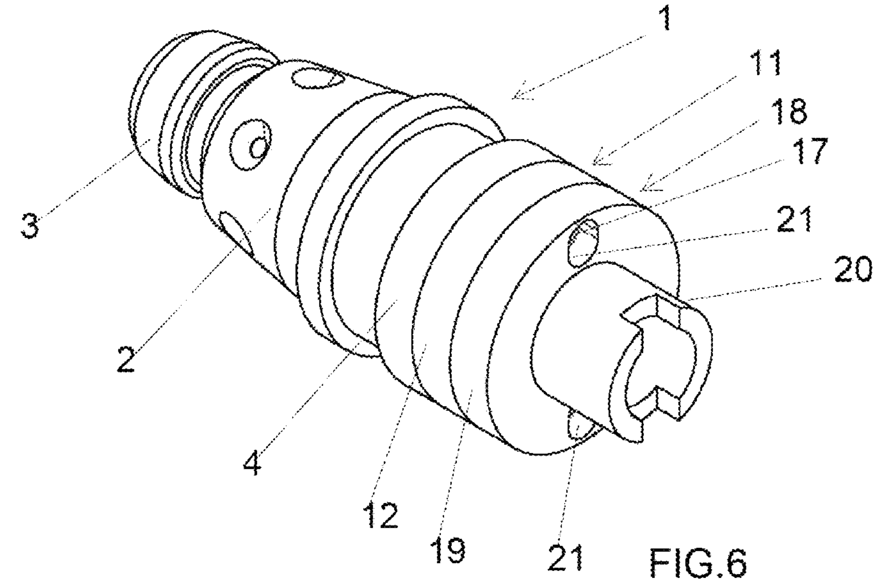
FIG.6

TOOL HOLDER FOR METAL DRILLING, THREADING AND MILLING MACHINES

CROSS-REFERENCE TO RELATED APPLICATIONS

This application claims priority to Spanish patent application No. P202330327 filed on Apr. 25, 2023, the entire contents of which are incorporated herein by reference.

TECHNICAL FIELD

The present invention relates to a tool holder intended for general application in the machinery industry and in particular for use in the manufacture of machines for drilling, threading and milling metal, since the device is a tool head that is able to self-align from its position in a misaligned hole by a distance of up to 1 mm, to enable the work to be completed without forcing or breaking the tool.

The device according to the invention is intended to improve and simplify operation of the mechanical means currently used in tool heads, on account of which the device has been designed and organized to prioritize ease-of-use, practicality and comfort when drilling and threading metal, being able to absorb deviations of 1 mm in misaligned holes in the work piece.

For this purpose, the device or tool head comprises a three-part system including the first or input part that transmits the rotation received from the machine to a second or intermediate part, which rotates with axial clearance along the horizontal axis X in a coordinate system, and this part in turn transmits the rotation to a third or output part that rotates with axial clearance along the vertical axis Y in the same coordinate system, providing the rotary movement of the tool head with axial clearance along both axes.

The parts of the tool holder form plates in which the plate of the input part and the plate of the output part have appendages that are intercalated without touching, in which a circular spring keeps them centered and aligned when there is no force causing them to be misaligned, whereas the plate of the intermediate part has two shafts or bolts on one face that are diametrically opposed along a horizontal line and two more shafts on the opposite side that are diametrically opposed along a vertical line, the horizontally arranged shafts or bolts being intended to be coupled to the input part and the vertically arranged shafts being intended to be coupled to the output part.

The three parts of the tool holder are joined together by a ring that is fastened to an appendage of the input part, closing the plate packet, and the intermediate plate is used for adjustment to prevent wobbling outside the shaft line.

BACKGROUND

Machines for threading, drilling and milling metal that have pantograph arms and multi-position tool heads enabling the metal to be worked in any position, as manufactured by the applicant, are known in the prior art.

However, there do not appear to be any tool heads for drilling, threading or milling machines that have structural means enabling the tool head positioned on a misaligned hole to self-align by a distance of up to 1 mm, enabling the metal to be worked without forcing or breaking the tool.

SUMMARY

The present invention is intended to bring to the market a tool holder for metal drilling, threading and milling machines that has a system comprising three parts that are structured and coupled such that the special transmission of the rotation of the parts enables the tool head to self-align in order to absorb deviations of 1 mm in misaligned holes in a metal piece.

Such self-alignment of the system is also facilitated by the structural form of the three parts of the tool holder, each of which has a plate, in which the plate of the first part and the plate of the third part are provided with axial appendages that are coupled together and are joined by a circular spring surrounding them and keeping them centered, whereas the plate of the intermediate part is coupled via both faces thereof to the plates of the first part and of the last part using shafts or bolts, which enables the plate of the intermediate part to rotate with axial clearance along the horizontal axis, while the third part rotates with axial clearance along the vertical axis.

DESCRIPTION

According to the invention, the tool holder for metal drilling, threading and milling machines enables deviations in the work piece of up to 1 mm to be absorbed without forcing or breaking the tool.

For this purpose, the tool holder is made up of three parts, of which the first or input part has an overall frustoconical body with a rounded projection at the free end thereof to enable it to be coupled to the machine for drilling or threading a metal piece.

The input part has a base forming a plate provided with two horizontally arranged diametrically opposed mounting holes, one on each side of an axial appendage of the plate, the appendage having concave lateral recesses and slots at the ends thereof for receiving a circular spring, while the surface of the appendage has several small threaded holes to allow the parts to be joined together.

This first or input part enables the rotation received from the machine to be transmitted to the second or intermediate part of the tool head.

The second or intermediate part is in the form of a plate with a large axial passage in which the axial appendage of the first part is seated, the plate having four threaded through-holes diametrically opposed in pairs and in a cross shape.

This intermediate part is arranged to enable two shafts or bolts perpendicular to the part to be screwed into one of the faces thereof, the shafts or bolts being intended to be seated in the horizontally arranged mounting holes in the first part, while two other perpendicular shafts or bolts are screwed into the opposite face of the plate and are intended to be seated in the third part.

This second or intermediate part receives the transmission from the first part and rotates with axial clearance along the horizontal axis X of a coordinate system.

The device has a third or output part in the form of a plate with a tubular axial passage that projects from the outer face of the plate and is intended to be coupled to a tool.

The inner face of the plate of the output part has two vertically arranged mounting holes that are intended to receive the two perpendicular shafts or bolts of the second part, with two oval appendages formed on the edge of the axial passage between the holes, the oval appendages having lateral slots intended to be coupled to the concave lateral recesses of the axial appendage of the first part, with the set of appendages being retained by the circular spring, which fits into the slots in the appendages and keeps the appendages centered and aligned.

This second part transmits the rotation to the third or output part, which rotates with axial clearance along the vertical axis Y in the same coordinate system, providing the rotary movement with axial clearance along both axes X and Y.

Finally, a ring is fastened using screws in the threaded holes in the surface of the axial appendage of the first part, thereby joining the three parts together and thus closing the plate packet, with the intermediate plate being used for adjustment to prevent wobbling outside the shaft line.

BRIEF DESCRIPTION OF THE DRAWINGS

A set of drawings showing the subject matter of the invention is attached to the description to enable greater understanding of the foregoing, without this graphical representation constituting a limitation of the specific features of this application.

FIG. 3 is an elevation view of the machine tool holder. This figure shows the three parts of the device once assembled together and joined to form a block.

FIG. 4 is a longitudinal cross section view of the machine tool holder. This figure shows that the intermediate part has two diametrically opposed orifices in one face of the plate into which two shafts or bolts are screwed, the shafts or bolts being seated in the mounting orifices of the plate of the third part, the tubular passage of which enables the closing ring for the plates to be fastened to the axial appendage of the first part.

FIG. 5 is an elevation view of the bottom of the machine tool holder. This figure shows the plate of the third part provided with two diametrically opposed mounting holes in which two shafts or bolts are seated. The tubular axial passage is shown centered on the plate, and the inside of the passage is coupled to the ring, which is fastened by two screws to the axial appendage of the first part.

FIG. 6 is a perspective view of the tool holder according to the invention, with the parts thereof joined together to form a block of rotary plates.

DETAILED DESCRIPTION

The different components that make up the tool holder for machines for drilling, threading and milling metal according to one embodiment are set out in detail below.

According to the invention, the tool holder for metal drilling, threading and milling machines enables deviations in the work piece of up to 1 mm to be absorbed without forcing or breaking the tool.

FIGS. 1, 2, 3, 4 and 6 show that the tool holder is made up of three parts, of which the first or input part (1) has a conical body (2) with a rounded projection (3) at the free end thereof for coupling to the machine.

Figure 1:
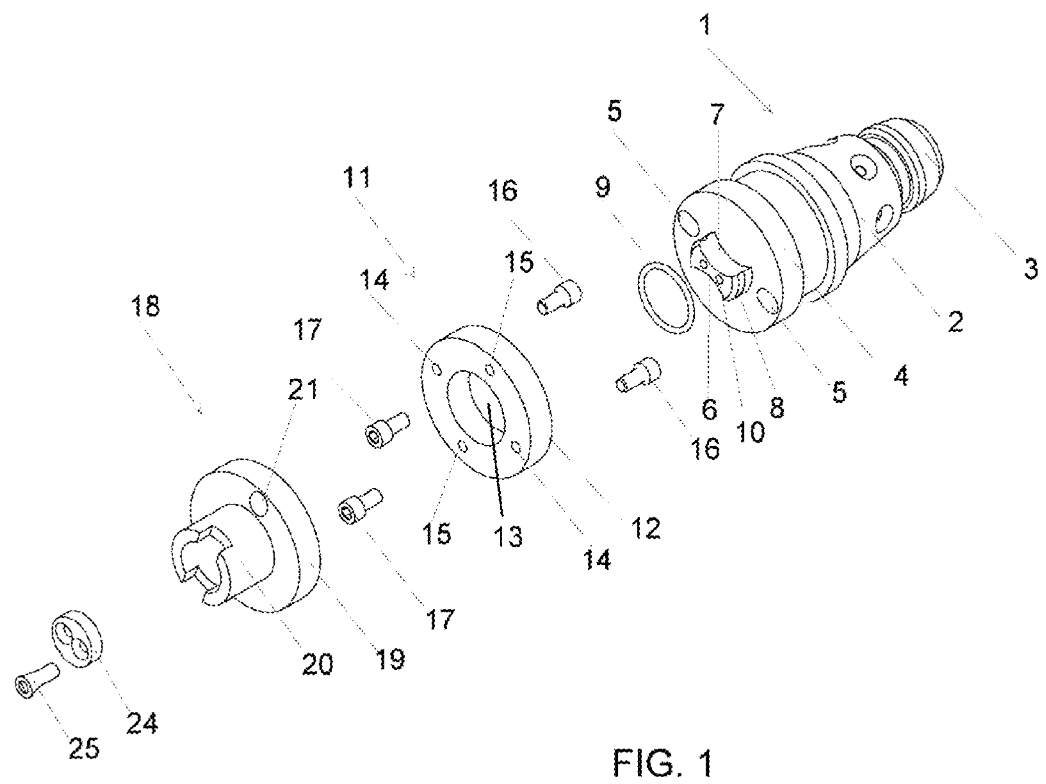
FIG. 1 is a perspective exploded view of the machine tool holder. As shown, it is made up of three parts, the first part having a conical body with a coupling to the machine and a base forming a plate with two mounting holes arranged on both sides of an axial appendage, the sides of which are concave and have slots for fitting a circular spring. A second part is then shown, the part being in the form of a plate provided with a large axial passage that has two diametrically opposed shafts or bolts on one face intended to be seated in the mounting holes of the plate of the first part, and two more shafts or bolts on the opposite face intended to be seated in the mounting holes of the plate of the third part. A ring for joining the three parts together using screws is also shown.

FIG. 1 shows that the input part (1) has a base forming a plate (4) having two horizontally arranged mounting holes (5), one on each side of an axial appendage (6), the appendage having concave lateral recesses (7) and slots (8) at the ends thereof for receiving a circular spring (9), and the surface of the appendage having several small threaded holes (10) to help join the parts together.

This first or input part (1) transmits the rotation received from the machine to the second or intermediate part (11).

Figure 2:
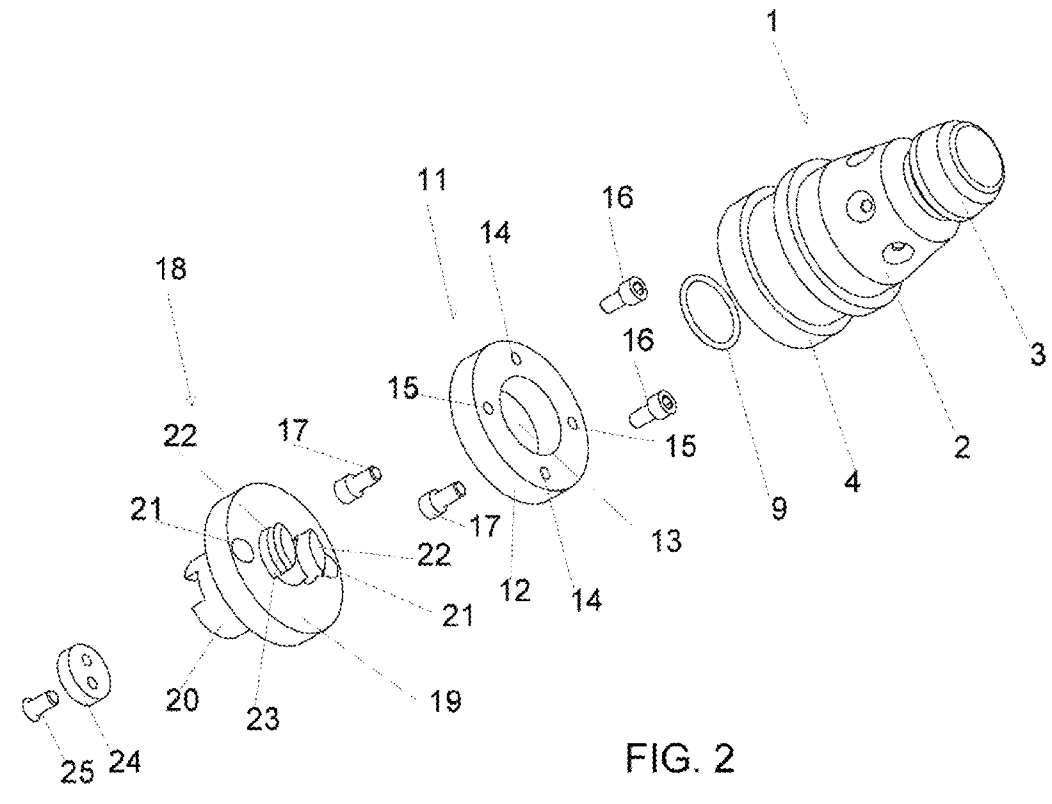
FIG. 2 is another perspective exploded view of the machine tool holder. As shown, the second part has two shafts or bolts on the rear face thereof that are screwed into two diametrically opposed holes in the part and are intended to be seated in the two mounting holes of the plate of the third part, which has two oval appendages arranged about the tubular axial passage and intended to be coupled to the concave recesses in the axial appendage of the first part. The ring enabling the three parts of the device to be joined together using screws fastened to the axial appendage of the first part is also shown.

FIGS. 1 and 2 show that the second or intermediate part (11) is in the form of a plate (12) with a large axial passage (13), in which the axial appendage (6) of the first part is seated, the plate having four threaded through-holes (14) and (15) diametrically opposed in pairs and in a cross shape.

FIGS. 1 and 2 show that the intermediate part (11) is arranged to enable two shafts or bolts (16) perpendicular to the part to be screwed into one of the faces thereof, the shafts or bolts being intended to be seated in the horizontally arranged mounting holes (5) in the first part, while two other perpendicular shafts or bolts (17) are screwed into the opposite face of the plate (12) to be joined to the third part.

This second or intermediate part (11) receives the rotation transmitted from the first part and rotates with axial clearance along the horizontal axis X in a coordinate system.

Similarly, FIGS. 1, 2, 3, 4, 5 and 6 show that the device has a third or output part (18) in the form of a plate (19) with a tubular axial passage (20) that projects from the outer face of the plate and is intended to be coupled to a tool.

FIGS. 1, 2, 4, 5 and 6 show that the inner face of the plate (19) of the output part (18) has two vertically arranged mounting holes (21) intended to receive the two perpendicular shafts or bolts (17) of the second part.

FIGS. 2 and 4 show that two oval appendages (22) are formed on the edge of the axial passage between the mounting holes (21), the oval appendages having lateral slots (23) and being intended to be coupled to the lateral concave recesses (7) in the axial appendage (6) of the first part, the set of appendages being retained by the circular spring (9), which is fitted into the slots in the appendages to keep them centered and aligned.

The second part (11) transmits the rotation to the third or output part (18), which rotates with axial clearance along the vertical axis Y in the same coordinate system, providing the rotary movement with axial clearance along both axes X and Y.

FIGS. 1, 2, 4 and 5 show a ring (24) that is fastened using screws (25) in the threaded holes (10) in the surface of the axial appendage (6) of the first part, thereby joining the three parts together and thus closing the plate packet, with the intermediate plate (12) being used for adjustment to prevent wobbling outside the shaft line.

What is claimed is:

1. A tool holder for metal drilling, threading, and milling machines that enables deviations in a work piece of up to one mm to be absorbed without forcing or breaking the tool, wherein the tool holder is made up of three parts comprising:

a first or input part that has a conical body with a coupling to a machine, that incorporates a first plate in a base thereof, the first plate being provided with two horizontally arranged diametrically opposed mounting holes, one on each side of an axial appendage that has concave sides and slots at the ends thereof for fitting a circular spring, while a surface of the axial appendage has several small threaded holes to allow the three parts to be joined together, the first or input part is configured to transmit a rotation received from the machine via the first plate to a second or intermediate part, the second or intermediate part in the form of a second plate with a large axial passage in which the axial appendage of the first part is seated, the second plate having four diametrically opposed through-holes and arranged in pairs in a cross shape and into which two perpendicular bolts or shafts are screwed on one face of the second plate such that the ends of these two perpendicular bolts or shafts are seated in the mounting holes of the first part, while the two other perpendicular bolts or shafts are screwed into the opposite face of the second plate to be joined via the ends thereof to a third or output part, the second or intermediate part receives the rotation transmitted from the first or input part and rotates with axial clearance in a first radial direction perpendicular to a longitudinal axis of the tool holder defining a shaft axis, the third or output part in the form of a third plate with a tubular axial passage that projects from an outer face of the third plate and is intended to be coupled to the tool, while an inner face of the third plate has two vertically arranged diametrically opposed mounting holes that are intended to receive the ends of two perpendicular shafts or bolts of the second part, with two oval appendages formed on the edge of the tubular axial passage between the two vertically arranged diametrically opposed mounting holes, the oval appendages having lateral slots intended to be coupled to the concave sides of the axial appendage of the first part, with the set of oval appendages being retained by the circular spring of the first part, which keeps the oval appendages centered and aligned, the second or intermediate part transmits the rotation transmitted from the first or input part to the third or output part, third or output part rotates with axial clearance in a second radial direction perpendicular to the longitudinal axis of the tool holder and orthogonal to the first radial direction, providing the rotary movement with axial clearance in both radial directions, and a ring that is fastened using screws in the threaded holes of the axial appendage of the first part, thereby joining the three parts together and thus closing a plate packet defined by the three parts, with the second or intermediate plate being configured to provide positional adjustment between the first or input part and the third or output part so as to maintain alignment about the longitudinal axis of the tool holder.

* * * * *